United States Patent [19]
Sheard

[11] 3,784,887
[45] Jan. 8, 1974

[54] PROCESS FOR MAKING CAPACITORS AND CAPACITORS MADE THEREBY

[75] Inventor: John Leo Sheard, Williamsville, N.Y.

[73] Assignee: E. I. du Pont de Nemours and Company, Wilmington, Del.

[22] Filed: Apr. 26, 1973

[21] Appl. No.: 354,840

[52] U.S. Cl............. 317/258, 29/25.42, 252/514
[51] Int. Cl.................................. H01g 1/01
[58] Field of Search................... 317/258; 29/25.42; 252/514

[56] References Cited
UNITED STATES PATENTS
3,619,744  11/1971  Stephenson................. 317/258

FOREIGN PATENTS OR APPLICATIONS
693,455  7/1953  Great Britain................. 317/258

Primary Examiner—E. A. Goldberg
Attorney—James A. Forstner

[57] ABSTRACT

An improved process for making multilayer monolithic capacitors, using metallizations which can be cofired with reactive dielectric materials at elevated temperatures. The metallizations contain critical proportionate amounts of Pt and/or Au and Pd, and optionally Ag. Also the resultant capacitors.

8 Claims, 1 Drawing Figure

PATENTED JAN 8 1974  3,784,887
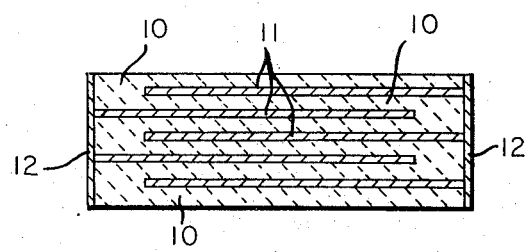

PROCESS FOR MAKING CAPACITORS AND CAPACITORS MADE THEREBY

BACKGROUND OF THE INVENTION

This invention relates to capacitors, and, more particularly to multilayer capacitors of ceramic dielectric layers and noble metal electrodes.

Multilayer monolithic capacitors comprise a multiple number of dielectric layers, at least some of which bear metallizations (electrodes) in desired patterns. Such capacitors are made from green (unfired) tape of ceramic particles held together with an organic binder, by cutting pieces of tape from a sheet of tape, metallizing some of the tape pieces, stacking and laminating the pieces of tape, and firing the resultant laminate to drive off organic binders and any vehicles and form a sintered (coherent) body, which is termed monolithic.

Gulton Industries Catalog No. H4D, "Ceramic Capacitors", 1970, p.11, shows a typical monolithic multilayer capacitor. Rodrieguez et al. U.S. Pat. No. 3,456,313 discloses a process for making them. FIG. 1 of Fabricius U.S. Pat. No. 3,223,905 shows a multilayer capacitor, which may be of alternating palladium and barium titanate layers.

Metallizations useful in producing conductors for multilayer capacitors normally comprise finely divided metal particles, applied to dielectric substrates in the form of a dispersion of such particles in an inert liquid vehicle. Selection of the composition of the metal particles is based on a compromise of cost and performance. Performance normally requires the use of the noble metals, due to their relative inertness during firing on dielectric substrates, to produce electrically continuous conductors, since non-noble (base) metals often react with the dielectric substrate during firing. This problem of reactivity is aggravated when electrode and substrate are cofired, that is, when metal patterns are deposited (printed) on green (unfired) ceramic sheets and printed sheets are fired together to mature both metal and ceramic. Among the noble metals, silver and gold melt at quite low temperatures (960°C. and 1063°C., respectively) and, hence, preclude the economy of simultaneously cosintering the dielectric substrate and conductor pattern, since the commonly used dielectric materials sinter at high temperatures, that is, above 1100°C. (e.g., barium titanate sinters at about 1350°C. and alumina at about 1600°C.). Melting of the conductor pattern would result in formation of discontinuous globules of metal. Palladium (m.p. 1555°C.) and platinum (m.p. 1774°C.) possess obvious advantages over gold and silver in this respect, among the more abundant noble metals.

Palladium is desirable as the principal or sole metal in conductor metallizations due to its low cost relative to other noble metals. A metallization employing palladium, but not suffering from diminution in performance characteristics (e.g., low melting point, poor conductivity, poor adhesion to the substrate, reactivity to the substrate, instability in air during firing above 1100°C.) is a significant technical goal.

It is common practice in the art of manufacturing multilayer capacitors to use as additives in the dielectric layer compounds of cations such as bismuth, antimony, and tin, to modify the temperature of firing and capacitor electrical properties. Especially common are dielectrics of barium titanate modified by bismuth oxide. However, such additives, particularly those of bismuth, cause a catastrophic reaction during cofiring of dielectric and metallization, where Pd is the electrode. It is therefore desirable to provide a palladium containing (and hence less expensive) noble metal electrode composition which exhibits reduced reactivity with dielectric additives (such as bismuth) on firing therewith.

SUMMARY OF THE INVENTION

In a process for making multilayer capacitors by printing finely divided noble metal powder on unsintered ceramic dielectric tape in the desired electrode pattern, laminating layers of such tape as desired, and firing the laminate to form a sintered coherent capacitor, this invention is an improved process wherein the noble metal powder printed on the tape is a mixture of noble metal powders or a noble metal alloy powder or a mixture thereof, of (a) platinum, gold or a mixture thereof and (b) palladium; the weight ratio of (a)/(b) being at least 1/1; there being at least 15 percent by weight palladium, based on the total weight of noble metal present. The noble metal may additionally comprise up to 40 percent by weight of silver, based on the total weight of noble metal. Such noble metal powders are most useful at firing temperatures up to about 1200°C.

Where firing temperatures up to about 1300°C. are used the noble metal powder may be (a) platinum, gold or a mixture thereof and (b) palladium, the weight ratio of (a)/(b) being at least 1.85/1; there being at least 15 percent by weight palladium, based on the total weight of noble metal present. The noble metal may additionally comprise up to 30 percent by weight silver, based on the total weight of noble metal.

Also a part of this invention are ceramic capacitors having at least one electrode and at least one counter-electrode separated by a layer of ceramic, characterized in that at least one of the electrode and counter-electrode consists essentially of the above-mentioned noble metal powders.

BRIEF DESCRIPTION OF THE DRAWING

In the drawing, the figure is a cross-sectional view of a monolithic multilayer capacitor of alternate layers of dielectric 10 and staggered electrodes 11, having terminal contact electrodes 12 at each end of the capacitor.

DETAILED DESCRIPTION OF THE INVENTION

The ratio of Pt and/or Au to Pd may be expressed on a weight or an atomic basis (by atomic basis I mean the relative number of atoms of the metals). Thus, where metallizations will be fired at temperatures not more than 1200°C., the ratio (Pt and/or Au)/Pd is at least 1/1 by weight and at least 0.54/1 on an atomic basis. Metallizations having a weight ratio of at least 1.85/1(or an atomic ratio of at least 1/1) may be fired at temperatures not exceeding 1300°C.

In the firing of a monolithic capacitor, several factors are involved in determining the reactivity of a palladium-containing electrode composition with a bismuth-containing dielectric green sheet, including (1) peak firing temperature to be attained, (2) time of residence at this peak temperature, (3) percentage of bismuth in the green sheet and (4) percentage of Pd in the electrode composition. Comparative experiments with green sheet using box furnace versus gradient furnace fire indicate that the reaction between the bismuth in the green sheet and the palladium in the electrode composition seems to be one of a vapor-solid interface type, although this theory is not intended to be limiting. Thus factors (1), (2) and (3) above determine the effective partial pressure (vapor pressure) of the bismuth in the green sheet and thus indicate the potential reactivity between bismuth and the electrode composition. For example, in going from 1100°C. to 1300°C. as a firing temperature, there is a tenfold increase in the partial pressure of a compound such as bismuth oxide over the substrate. With this range in vapor pressure it is essential that at longer times and higher firing temperatures the quantity of palladium in the electrode be effectively lowered if reaction is to be minimized. For this reason, the ratio (Pt and/or Au)/Pd is variable with temperature in the present invention. This is particularly true when the percent bismuth in green sheet is in the range 0.1–10 percent, which is common in commercial ceramic capacitor formulations.

The metals may be present as either mixtures of particles of each of the metals, or as alloy particles, or as mixtures of alloy particles and particles of individual metals, so long as the relative proportions or metals are as set forth above. Conventionally prepared alloy particles may be used (see, e.g., Hoffman U.S. Pat. Nos. 3,390,981 and 3,385,799 and Short U.S. Pat. No. 3,620,714).

Finely divided barium titanate and/or glass powder may optionally be added to these metallizations, at levels up to about 10 percent, for the purpose of enhancing both adherence of the metallization to the substrate and film continuity.

The metallizing compositions are prepared from the solids and vehicle by mechanical mixing. The metallizing compositions of the present invention are printed as a film onto ceramic dielectric substrates in the conventional manner. Generally, screen or mask stenciling techniques are preferably employed. The metallizing composition may be printed either dry or in the form of a dispersion in an inert liquid vehicle.

Any inert liquid may be used as the vehicle. Water or any one of various organic liquids, with or without thickening and/or stabilizing agents and/or other common additives, may be used as the vehicle. Exemplary of the organic liquids which can be used are the aliphatic alcohols; esters of such alcohols, for example, the acetates and propionates; terpenes such as pine oil, α- and β-terpineol and the like; solutions of resins such as the polymethacrylates of lower alcohols, or solutions of ethyl cellulose, in solvents such as pine oil and the monobutyl ether of ethylene glycol monoacetate.

The ratio of inert vehicle to solids in the metallizing compositions may vary considerably, and depends upon the manner in which the dispersion of metallizing composition in vehicle is to be applied and the kind of vehicle used. Generally from 0.5 to 20 parts by weight of solid per part by weight of vehicle will be used to produce a dispersion of the desired consistency. Optimum dispersions contain 30–70 percent liquid vehicle.

As indicated above, the metallizing compositions are printed onto dielectric ceramic substrates, after which the printed substrate is fired to mature the body, thereby forming a monolithic capacitor.

Although the printing, dicing (cutting), stacking and firing techniques used in multilayer capacitor manufacture vary greatly, in general the requirements for a metallizing composition used as an electrode are (1) reasonable (two hours or less) drying time, (2) nonreactivity with green ceramic binders (reaction causes "curling" or even hole formation during printing and drying), (3) nonreactivity with ceramic components during firing (e.g., Pd reaction with bismuth causing shattering of capacitors), (4) stability during firing in the air (i.e., does not become nonconductive), and (5) non-melting under peak firing conditions.

After printing of the electrode onto the green ceramic, the resulting pieces are then either dry or wet stacked to the appropriate number of layers (normally anywhere from five to 60 depending upon design), pressed (up to 3000 psig with or without heat) and diced.

A typical firing cycle for multilayer capacitors comprises two phases. The first, which may last up to several days, is called bisquing. Maximum temperature reached may be anywhere from 600°–1000°F. The purpose is the noncatastrophic removal of organic binder both in the electrodes and the green sheets. After this is accomplished a rapid (six hours or less) heat-up to the desired "soaking"temperature for maturing of the ceramic takes place. Soaking temperature depends upon the composition of the ceramic. In general, with barium titanate as the main component, soaking temperatures range from about 1180°C. to 1400°C. (2156°F. to 2550°F.). Rate of cool-down of the parts after soaking depends upon thermal shock considerations.

EXAMPLES

The following examples and comparative showings are presented to illustrate the advantages of the present invention. In the examples and elsewhere in the specification and claims, all parts, percentages, proportions, etc., are by weight, unless otherwise stated.

Effective dielectric constant (effective K) and dissipation factor were determined as follows. The fired multilayer capacitors were mounted in the jaws of an automatic RLC Bridge (General Radio Model No. 1683) where both capacitance and D.F. were automatically read. Knowing the capacitance, dimensions of electrode and thickness of fired dielectric, effective K was determined from:

Effective K =
[(Reading in picofarads) (thickness)$(2.9 \times 10^{-2})$/area of electrode]

thickness being in mils and area in square centimeters. Resistivity was determined on 1-mil thick elements.

In the examples and comparative showings, all inorganic solids are finely divided; the maximum particle size was less than one micron; surface areas were in the range 0.3–12 m.2/g.

EXAMPLES 1–3; Showings A and B

Three-layer capacitors having buried electrodes were prepared as follows: Green (unfired) ceramic sheets were prepared from barium titanate containing about 10 percent bismuth calculated as the element. The thickness of the green sheet was about 1.4 mils. Discs about one-half inch in diameter were cut from the green ceramic sheet. An electrode was printed (325 mesh screen) on one surface of a ceramic disc, using the metallizations set forth in Table 1. One part metal per part of vehicle (terpineol) was used.

A similar ceramic disc was provided with a small V-shaped notch at its edge, and was placed over the metallized disc. A second electrode was printed on the notched disc, the two electrodes making contact at the notch. A third ceramic disc, also having a V-shaped notch, was placed over the second electrode, with the notch rotated 90° from the notch of the lower ceramic disc.

The three ceramic discs (two metallized) were pressed together at 150°C. for 15 minutes, heated at 500°C. for 16 hours, and then fired at 1200°C. for two hours.

The data in Table 1 illustrate the effect of reducing the ratio (Pt and Au/Pd). Once the ratio is reduced below a certain level (1/1), the resulting capacitor is useless. This is true regardless of the melting point of the particular metal employed; compare Example 1 and Showing B, having the same melting point but different metal composition.

EXAMPLES 4-16 AND COMPARATIVE SHOWINGS C-I

Various electrode candidates were evaluated by the following procedure.

Two barium titanate dielectric powder compositions were dispersed (80 percent solids) in an inert vehicle (terpineol and ethyl cellulose). One of the compositions contained 6 percent bismuth, calculated as the element, and the other no bismuth (data on these are reported in Table 2). A third dielectric contained 10 percent bismuth (Table 3). Three quarter-inch square patterns of each dielectric composition were double printed, using a 200 mesh screen on one inch square Alsimag dielectric chips, then dried at 150°C. for 15 minutes. The dried prints were about 2.5 mils thick.

A series of electrode compositions were then printed through a 325 mesh screen over the printed dielectric layer as a one-half by one-fourth inch rectangle, then dried at 150°C. (dried thickness about 0.9 mil). A ½ × ½ inch square dielectric of the same composition as the first dielectric layer was then printed over the electrode so that one-half of the electrode was exposed.

The dielectric containing 6 percent bismuth was National Lead Co.'s Tamtron 5034; the bismuth-free dielectric was Tamtron 5037.

Metal pastes of the compositions set forth in Table 2 were cofired with each of these dielectrics; the metal pastes contained 50 percent metal and 50 percent vehicle (rosin, ethylhydroxy-ethylcellulose, naphtha and terpineol).

The data in Tables 2 and 3 show that as the ratio of (Pt and/or Au)/Pd is decreased, a critical point is reached where the reaction of Pd with the bismuth-containing substrate is no longer masked, even at 1200°C. (compare C, 4, 5 and D), and that the stability of the electrode toward bismuth is independent of its melting point (compare 5 with C and 7 with F).

TABLE 1.—COMPARATIVE BEHAVIOR OF VARIOUS ELECTRODE COMPOSITIONS ON BISMUTH (ABOUT 10%) CONTAINING DIELECTRIC SHEET

| Example or showing | Electrode composition (wt. percent) | Ratio (Pt+Au) Pd. (wt.) | Atomic | Melting point (°C.) | Effective K | D.F. (percent) |
|---|---|---|---|---|---|---|
| Ex. 1 | 75 Au 25 Pd | 3/1 | 1.65/1 | 1400 | 1043 | 1.0 |
| Ex. 2 | 60 Au 20 Ag 20 Pd | 3/1 | 1.65/1 | 1300 | 885 | 0.8 |
| Ex. 3 | 54 Au 16 Ag 30 Pd | 1.8/1 | 1.1/1 | 1380 | 890 | 0.9 |
| Show. A | 50 Au 20 Ag 30 Pd | 1.7/1 | 0.89/1 | 1350 | * | — |
| Show. B | 50 Au 15 Ag 35 Pd | 1.4/1 | 0.76/1 | 1400 | * | — |

*Melted due to interaction with dielectric sheet on firing.

TABLE 2.—COMPARATIVE BEHAVIOR OF VARIOUS ELECTRODE COMPOSITIONS ON DIELECTRICS WITH (A) 6% BISMUTH (B) AND WITH NO BISMUTH

| Example (No.) or showing (letter) | Electrode composition (wt. percent) | Melting point (°C.) | Ratio (Pt +Au) Pd (atomic) | Condition* of electrode after firing at — | | | |
|---|---|---|---|---|---|---|---|
| | | | | 1200° C. | | 1300° C. | |
| | | | | (A) | (B) | (A) | (B) |
| C | 100 Pd | 1550 | — | M | C | M | C |
| 4 | 30 Pt/30 Pd/40 Au | 1575 | 1.25/1 | C | C | C | C |
| 5 | 10 Pt/45 Pd/45 Au | 1525 | 0.67/1 | C | C | C | C |
| D | 10 Pt/55 Pd/35 Au | 1540 | 0.44/1 | M | C | M | C |
| E | 20 Ag/40 Pd/40 Au | 1400 | 0.53/1 | C | C | M | C |
| 6 | 30 Ag/30 Pd/40 Au | 1325 | 0.71/1 | C | C | C | C |
| 7 | 15 Ag/35 Pd/50 Au | 1400 | 0.76/1 | C | C | C | C |
| 8 | 35 Pd/65 Au | 1450 | 1:1 | C | C | C | C |
| F | 65 Pd/35 Ag | 1400 | — | M | C | M | C |
| G | 50 Pd/50 Ag | 1350 | — | M | C | M | C |
| 9 | 25 Pd/75 Au | 1400 | 1.65/1 | C | C | C | C |
| 10 | 50 Pd/50 Au | 1470 | 0.53/1 | C | C | M | C |
| 11 | 6 Pt/27 Pd/27 Au/40 Ag | 1320 | 0.68/1 | C | C | M | C |
| 12 | 10 Pt/20 Pd/70 Au | 1450 | 2.11/1 | C | C | C | C |

*M means formed metal droplets (useless electrode); C means continuous film.

TABLE 3

Comparative Behavior of Various Electrode Compositions on Dielectrics with (A) 10% Bismuth and (B) No Bismuth

| Example (No.) or Showing (Letter) | Electrode Comp. | Condition* of Electrode after Firing at: 1200°C. | | 1300°C. | |
|---|---|---|---|---|---|
| | | (A) | (B) | (A) | (B) |
| 13 | Example 4 | C | C | C | C |
| 14 | Example 5 | C | C | M | C |
| H | Showing D | C | C | M | C |
| 15 | Example 8 | C | C | C | C |
| 16 | Example 9 | C | C | C** | C |
| I | Example 10 | C | C | M | C |

*Same as Table 2.
**High resistivity: 200 Ohms per square.

I claim:

1. In a process for making multilayer capacitors by printing finely divided noble metal powder on unsintered ceramic dielectric tape in the desired electrode pattern, laminating layers of such tape as desired, and firing the laminate to form a sintered coherent capacitor, an improved process wherein the noble metal powder printed on the tape is a mixture of noble metal powders or a noble metal alloy powder or a mixture thereof, of (a) platinum, gold or a mixture thereof and (b) palladium; the weight ratio of (a)/(b) being at least 1/1; there being at least 15 percent by weight palladium, based on the total weight of noble metal present.

2. A process according to claim 1 where the noble metal additionally comprises up to 40 percent by weight of silver, based on the total weight of noble metal.

3. A process according to claim 1 wherein the noble metal powder is (a) platinum, gold or a mixture thereof and (b) palladium, the weight ratio of (a)/(b) being at least 1.85/1; there being at least 15 percent by weight palladium, based on the total weight of noble metal present.

4. A process according to claim 3 wherein the noble metal additionally comprises up to 30 percent by weight silver, based on the total weight of noble metal.

5. A ceramic capacitor having at least one electrode and at least one counterelectrode separated by a layer of ceramic, characterized in that at least one of the electrode and counterelectrode consists essentially of a mixture of noble metal powders or a noble metal alloy powder or a mixture thereof, of (a) platinum, gold or a mixture thereof and (b) palladium; the weight ratio of (a)/(b) being at least 1/1; there being at least 15 percent by weight palladium, based on the total weight of noble metal present.

6. A ceramic capacitor according to claim 5 wherein at least one of the electrode and counterelectrode consists essentially of a noble metal powder additionally comprising up to 40 percent by weight of silver, based on the total weight of noble metal.

7. A ceramic capacitor according to claim 5 characterized in that at least one of the electrode and counterelectrode consists essentially of a mixture of noble metal powders or a noble metal alloy powder or a mixture thereof of (a) platinum, gold or a mixture thereof and (b) palladium, the weight ratio of (a)/(b) being at least 1.85/1; there being at least 15 percent by weight palladium, based on the total weight of noble metal present.

8. A ceramic capacitor according to claim 7 wherein at least one of the electrode and counterelectrode consists essentially of a noble metal powder additionally comprising up to 30 percent by weight of silver, based on the total weight of noble metal.

* * * * *

Disclaimer 3,784,887.—*John Leo Sheard*, Williamsville, N.Y. PROCESS FOR MAKING CAPACITORS AND CAPACITORS MADE THEREBY. Patent dated Jan. 8, 1974. Disclaimer filed Feb. 3, 1976, by the assignee, *E. I. du Pont de Nemours and Company*.

Hereby enters this disclaimer to all claims of said patent.

[*Official Gazette March 23, 1976.*]